United States Patent [19]

Trawinski

[11] 4,216,081
[45] Aug. 5, 1980

[54] METHOD AND ARRANGEMENT FOR CONTINUOUS REGULATION OF THE SPECIFIC SLIME GRAVITY OR SLIME CONCENTRATION IN SETTLING CHAMBERS

[75] Inventor: Helmut F. Trawinski, Hirschau, Fed. Rep. of Germany

[73] Assignee: Amberger Kaolinwerke GmbH Co., Fed. Rep. of Germany

[21] Appl. No.: 943,800

[22] Filed: Sep. 19, 1978

Related U.S. Application Data

[63] Continuation of Ser. No. 797,916, May 18, 1977, abandoned.

[30] Foreign Application Priority Data

Apr. 13, 1977 [DE] Fed. Rep. of Germany ....... 2622988

[51] Int. Cl.² .......................................... B03B 11/00
[52] U.S. Cl. .................................... 209/496; 210/533
[58] Field of Search ............... 209/211, 496, 488–491, 209/494; 210/512 R, 533, 532 R, 532 S; 137/4, 92

[56] References Cited

U.S. PATENT DOCUMENTS

| | | | |
|---|---|---|---|
| 1,220,092 | 3/1917 | Gomez | 210/519 X |
| 1,673,954 | 6/1928 | Schmidt | 173/4 X |
| 2,954,871 | 10/1960 | Lummus et al. | 209/211 |
| 3,034,647 | 5/1962 | Giesse | 209/211 X |
| 3,334,742 | 8/1967 | Thamme | 209/496 X |

FOREIGN PATENT DOCUMENTS 704765 3/1954 United Kingdom ...................... 134/4

*Primary Examiner*—Ralph J. Hill
*Attorney, Agent, or Firm*—Holman & Stern

[57] ABSTRACT

A method and apparatus for continuously regulating the slurry-weight or slurry-concentration of the discharge for wet-mechanical separated solids from suspensions in which a discharge cross-section of a separation is controlled as the slurry is discharged including means for measuring the viscosity of a discharge slurry formed from separated solids for altering the cross-sectional opening of a discharge member the separator by either increasing or decreasing the discharge cross-section in relation to the slurry viscosity and acccordingly the slurry weight is retained constant and at an approximate predetermined value.

6 Claims, 10 Drawing Figures

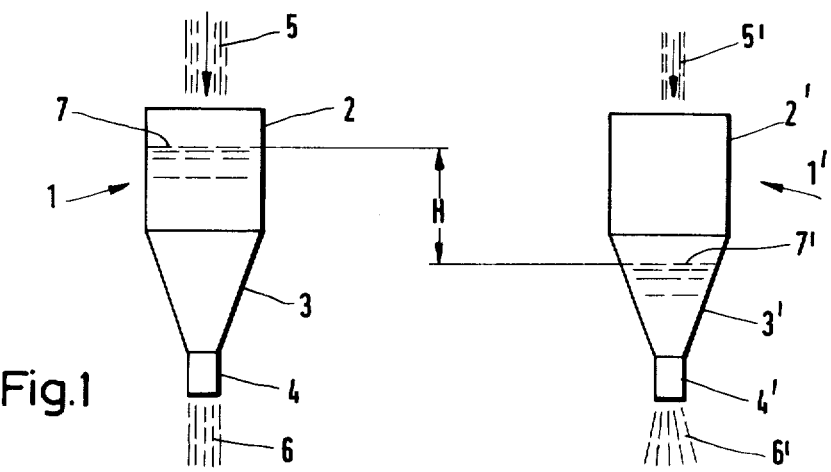
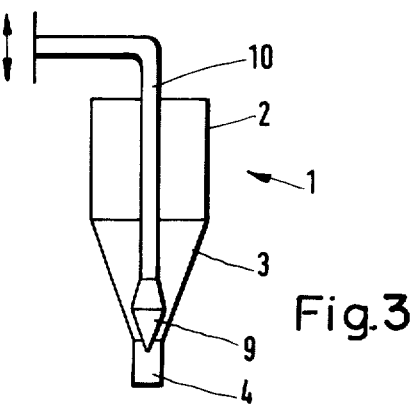
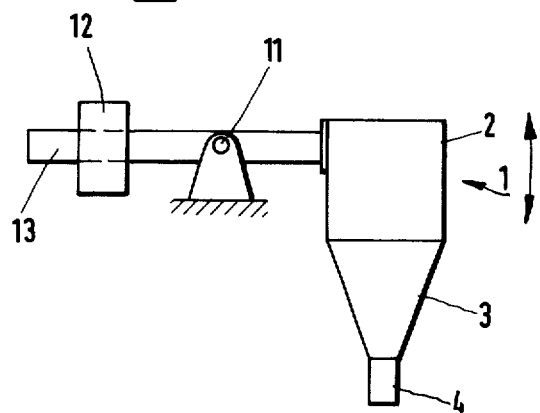

METHOD AND ARRANGEMENT FOR CONTINUOUS REGULATION OF THE SPECIFIC SLIME GRAVITY OR SLIME CONCENTRATION IN SETTLING CHAMBERS

This is a continuation of application Ser. No. 797,916, filed May 18, 1977 which in turn is now abandoned.

FIELD OF THE INVENTION

The instant invention concerns a method and a system including a component arrangement for the continuous regulation of the specific slime-gravity or slime concentration in separators for the wet-mechanical separation, either with or without centrifugal operation, of solids from suspensions by altering the opening cross section of the discharge opening.

BACKGROUND OF THE INVENTION

It is known in the art to perform synchronous control of the discharge at a respective discharge member of a separator and thereby the settling rate in the separator by measuring the slurry by means of gamma rays; this control is extremely costly, and, in addition, requires adherence to strict safety measures.

Control of the discharge of the discharge opening was also effected on the basis of measuring the specific slurry-gravity in the laboratory; this method of measuring the specific slurry-gravity in the laboratory and consequent regulation on the discharge opening is insufficient for practical commercial operation, or deficient, since through this laboratory method the separator can be timely adjusted to a lapsed operational condition, but adjustment is difficult to compensate to a presently existing operational condition.

OBJECTS AND SUMMARY OF THE INVENTION

It is the scope of the instant invention to provide an improvement over the methods mentioned above in that (1) there immediately results an efficient continuous regulation with respect to the immediate, prevailing operational condition, and, (2) the immediate control is obtained with a comparatively low expenditure for equipment.

In order to solve this problem, the instant invention firstly proposes that in a method of the above-mentioned type, the viscosity of the slurry being discharged, which consists of the eliminated solids, is measured by weighing the filling level in a flow through a container outside the separator, and upon a changing i.e. increasing or reducing of the viscosity, the opening cross section of the separator's discharge opening is adjusted, i.e., increased or reduced, in a manner so that the viscosity, and therewith the slurry-weight, is retained constant to an adjustable value. It has been proven that the slurry-viscosity of the slurry being discharged is a standard which can be efficiently utilized to result in adjusting the slurry-weight or slurry-concentration. The apparatus required for adjusting the opening cross section of the discharge opening is very simple and may consist of purely mechanical parts; to this is added mechanical structural parts which are very insensitive to humidity and clogging and which are positively existing factors in wet separators, and are therefore sturdy and resistant to shut-down or interruptions.

The instant invention proposes an arrangement for performing the above-mentioned method in a separator, for example a hydrocyclone, in which the slurry is being discharged from a discharge member having an adjustable opening cross section so that a viscosity-measuring container is arranged below the discharge member, which either entirely or partially receives the slurry flow being discharged from the discharge member, and permits the slurry to flow through an outlet which is narrower in comparison with its cross section. There is provided a control-device serving to maintain the viscosity and density of the slurry flow discharged from the separator at a constant rate, whereby the control device, due to changes, i.e., increase or reduction of the slurry quantity, located at the viscosity-measuring container above the opening of the same, either increases or decreases the opening cross section of the discharge member of the separator; with accumulation of the amount of slurry occur increases in the flow-speed at the outlet of the viscosity-measuring container, while with the increase of the viscosity said flow-speed decreases.

Thus, when the viscosity is too high, the amount of slurry in the viscosity-measuring container is increased. This results in an increase of the opening cross section of the discharge member until the desired, or required, flow-speed at the container is adjusted. Therewith results a regulation of the slurry-discharge at the discharge member of the separator which is proportional to this speed. Thus, with the measuring of the slurry-viscosity there is obtained the contant density of slurry which constant is important for subsequent procedures or preparation. Additionally, the slurry-density can thereby be retained at a maximum value, i.e., at a maximum concentration, in which the separation is substantially improved as compared with a thin slurry; such a viscosity-measuring container functions efficiently and its structural parts are very simple and economical to manufacture, as well as being sturdy and insensitive avoiding substantially a production-shutdown.

The regulation of the slurry discharge at the discharge member may be effected by means of electrical, hydraulic or pneumatic adjustments of a respective throttle valve. According to a preferred embodiment, this control or throttling may be accomplished mechanically so that push rods are affected by the weight of the viscosity-measuring container, and the push rods compare the weight of the viscosity-measuring container with the adjustable weight, and via a mechanical adjusting member adjusts the opening cross section of the discharge opening in accordance with the weight difference. According to the instant invention, a mandrel which changes the cross section of the discharge member may be utilized as the mechanical adjusting member, or as the throttle device.

As mentioned above, the separator may be a hydrocyclone, whereby a corresponding adjustment of the reject-nozzle is made; the instant invention may also be utilized as a slurry-weight regulator for sediment tanks (clarification thickeners), whereby, dependent on the viscosity measurement, either a throttle-mandrel and a discharge member cooperate with each other, or an adjustment of a membrane pump, which effects the slurry discharge in the known manner, is made. An additional example of utilization is in a hydraulic classifier with upstream action whereby the regulation arrangement again cooperates with a throttle mandrel, or, however, affects the valve means of the same; here, also, the viscosity is being utilized as indicator and size-control for regulating the slurry weight.

Additional advantages, characteristics and applications of the invention will become apparent from the following description taken with the drawings, showing exemplary embodiments of the instant invention, wherein:

BRIEF DESCRIPTION OF THE FIGURES OF THE DRAWINGS

FIG. 1 is diagrammatic representations to illustrate the principle of a viscosity-measuring container;

FIGS. 2 to 4 diagrammatically illustrate embodiments of the viscosity-measuring container of the invention;

DESCRIPTION OF THE PREFERRED EMBODIMENTS

Figures 5, 6:
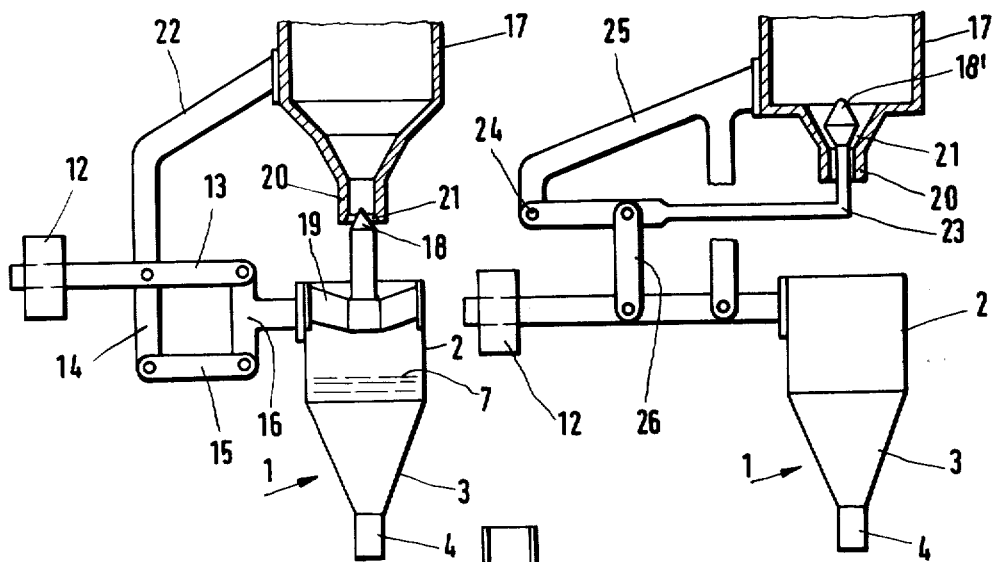
FIGS. 5 to 7 show arrangements of the viscosity-measuring arrangement of the invention for regulating the underflow discharge nozzle of hydrocyclones.

A viscosity-measuring container 1 is pot-shaped in elevation and, in this example, is provided with an upper cylindrical portion 2 connected to an adjacent, downwardly-converging conical portion 3, connected to a discharge opening 4. A slurry-flow 5 is discharged from a suitable source such as a respective discharge member of a separator, i.e. a hydrocyclone. The stream 5 flows continuously through the container 1 leaving it at the discharge opening 4.

The container 1 has passing therethrough either the entire discharge slurry (main flow) or only a proportional portion of the slurry (bypass). If the solids content of the slurry 5 is high, then this results in a respective increase of the slurry weight as well as an increased effective viscosity of this dual-phase mixture. This results primarily in a reduction of the discharge speed of the slurry flow 6 from the discharge opening 4 of container 1, and, secondly, in an increase of the fill-level 7 in container 1 up to reaching a traversal speed which is required for a continuous yield. According to FIG. 1, during a thick inflow 5 and at an initially slower discharge speed of the slurry flow 6, there results a relatively high fill-level 7. The slurry inflow 5' has only a thin concentration; accordingly, this results in a lower viscosity of the slurry flow 6' and therewith a lower level of 7'. The level-difference H is the measured variable utilized for the regulation. The increased volume in the case of container 1 in FIG. 1 produces in connection with the slurry weight which is simultaneously higher in this case, a rotably increased fill-weight of container 1. This weight-difference may be beneficially utilized by weighing to the regulated constant-retention of the concentration of the slurry flow 5 which is being discharged from the separator's discharge member. It is thereby recommended to provide in FIG. 2 an exchangeable outflow nozzle 8 for providing different cross sections at the discharge opening 4 (FIG. 2). According to FIG. 3, in place of the nozzle 8 of FIG. 2, there may be provided an axially-displacable throttle mandrel 9 which is also automatically adjustable by means of push rods 10. Thus, the viscosity-measuring container 1 is adjustable to the respective area of adjustment, which results substantially from the total discharge capacity of the separator, for example, a hydrocyclone, and the expected consistency of the slurry 5. The two above-noted factors determine the amount of slurry-discharge per time unit. It is to be understood that also the volume of the measuring container 1 must be constructively adapted to the slurry discharge amount expected per time unit.

FIG. 4 illustrates the principle of a tiltable positioning of the viscosity-measuring container for displacing the height of the position under a changed fill-weight. The zero position is calibrated by means of a counter-weight 12, which is adjustable on the scale balance 13. Instead of the pivot bearing 11, there may also be proposed a parallel linkage by means of pivotally-connected guide rods 14, 15 and 16, which are shown in FIG. 5. In FIG. 5, the viscosity-measuring container remains in the vertical position during the lowering or lifting operation, and FIG. 5 further shows how this arrangement may be utilized for retaining the solids content in a constant state in the underflow of a hydrocyclone 17 by utilizing the slurry viscosity as the measured variable of a control loop. A mandrel 18 is fastened to the upper surface of the measuring container 1 by means of connecting porter 19 and penetrates wholly or partially into the underflow (eject) nozzle 20 of the hydrocyclone 17.

In case the solids content of the slurry being discharged from member 20 according to level 7 in FIG. 1 is too high, then the slurry level 7 rises in container 1; there increases, as above explained, the slurry weight in container 1 and container 1 moves downwardly. This results in an increase of the cross section opening 21 at the nozzle 20 and therewith in a reduction of the solids content of the slurry being discharged. This reduction in turn effects a lowering of the slurry level 7 in container 1. If the viscosity of the slurry in this container 1 is too low and the slurry level 7 becomes thereby too low, then this results in a corresponding reduction of the weight in the container 1 and thereby its being lifted upwards (by weight 12 and the parallel linkage), which, in turn, results in a reduction of the clearance 21 through mandrel 18. The above-described control arrangement oscillates to a predetermined value in the concentration of the slurry discharge from clearance 21 in nozzle 20, whereby this value is adjustable by means of the positioning of the weight 12 on the scale balance 13. In order to guarantee a smooth operation, it is recommended that a dampening device, not shown, be attached for the tilting movements of lever 13.

In the embodiment of FIG. 5, the parallel linkage 13–16 is fixedly attached to the casing of the hydrocyclone 17 by means of an extension 22 of the guide rod 14.

This arrangement may also be realized in a manner where a mandrel 18' is located inside the cyclone 17, and can close the underflow eject nozzle 20 from the top or the inside as seen in FIG. 6. The mandrel 18' is located on a lever 23 which is arranged to be tiltable around a bearing 24 of a support arm 25 fixedly mounted on the cyclone 17. The tilting movement of the measuring container 1 is transmitted to the lever 23 by means of a guide rod 26. Also in this embodiment, the opening or enlarging of the opening cross section 21 results in a thin-flow, while a thick-flow of the slurry exiting from the nozzle 20 will result from the reduction of this cross section.

Figure 7:
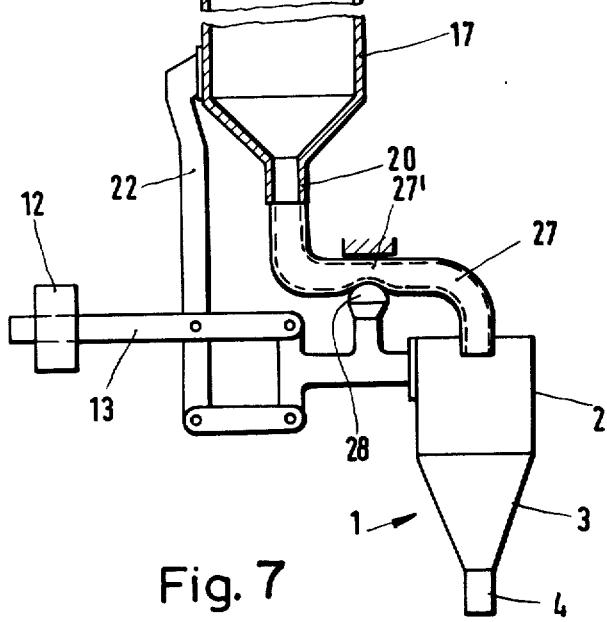

FIG. 7 shows a device having a structure which is similar to the arrangement of FIG. 5. However, the reduction of the opening cross section of nozzle 20 is herein made by means of compressing an intermediate elastic tube 27 at point 27' by means of stem 28 which has herein taken over the function of the mandrel 18. Also in this example, the concentration of the slurry discharged from the hydrocyclone 17 is retained constant.

In place of the mandrel 18, 18' or the stem 28, the changing of the weight of the viscosity-measuring container 1 can be permitted to affect a different device for a corresponding changing of the opening cross section 21 of the discharge nozzle 20. This device may be a hydraulic, pneumatic or electrical regulating device of the opening cross section.

Figure 8:
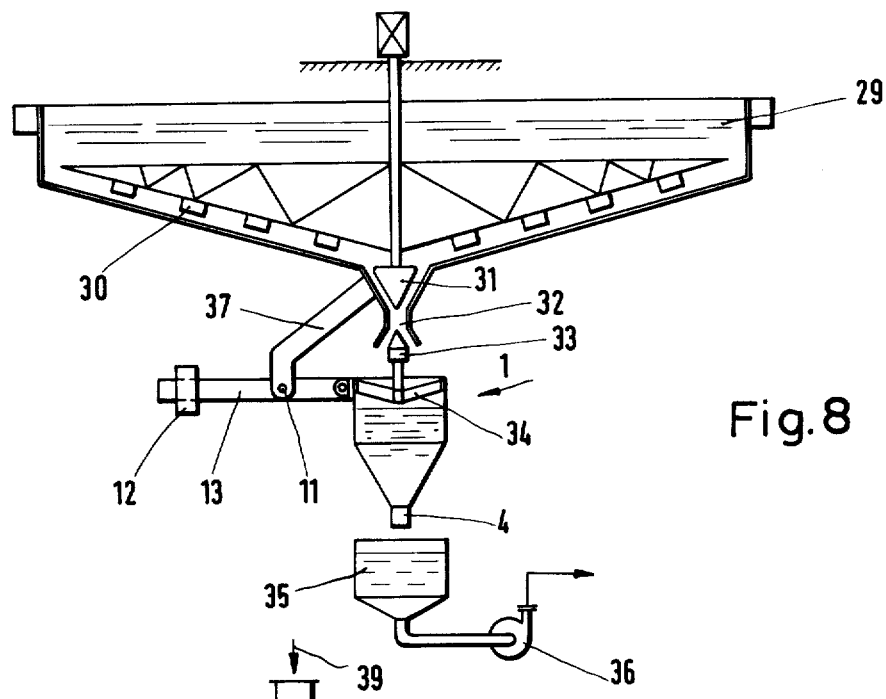
FIG. 8 is a schematic illustration of the arrangement of a viscosity-measuring container according to the invention for regulation on a clarification thickener.

FIG. 8 shows the arrangemet of a viscosity-measuring container 1 according to the instant invention on a clarification thickener (deslimer or thickener, depending on the given problem), whereby the drawing shows a circular thickener. It is also possible to mount the viscosity-measuring container 1 on a rectangular thickener or sediment holder without a rake mechanism. All types of clarification thickeners may be driven by means of overloading, also as separator-thickeners (hydroseparators), i.e., as wet classification means; in this case, the instant invention can be suitable utilized.

The example for the circular thickener 29 as illustrated in the example is provided with a rake mechanism 30; below a cone-rake 31 where is located a discharge nozzle 32 having an opening cross section which can be either reduced or enlarged by means of a mandrel 33. The mandrel 33, in this case, is connected with the measuring container 1 by means of a connecting porter 34. The slurry from the discharge member 4 of the container 1 is collected in a sump 35 and removed from there by means of a sump pump 36. Similar to the embodiments shown in FIGS. 4 and 5, a scale balance 13, with weights 12 adjustably placed thereon, is provided, and at 11 is a pivot for hinging from a lever arm indicated at 37. The support arm or lever 37 is fixedly mounted on the housing of the thickener 29.

Figure 9:
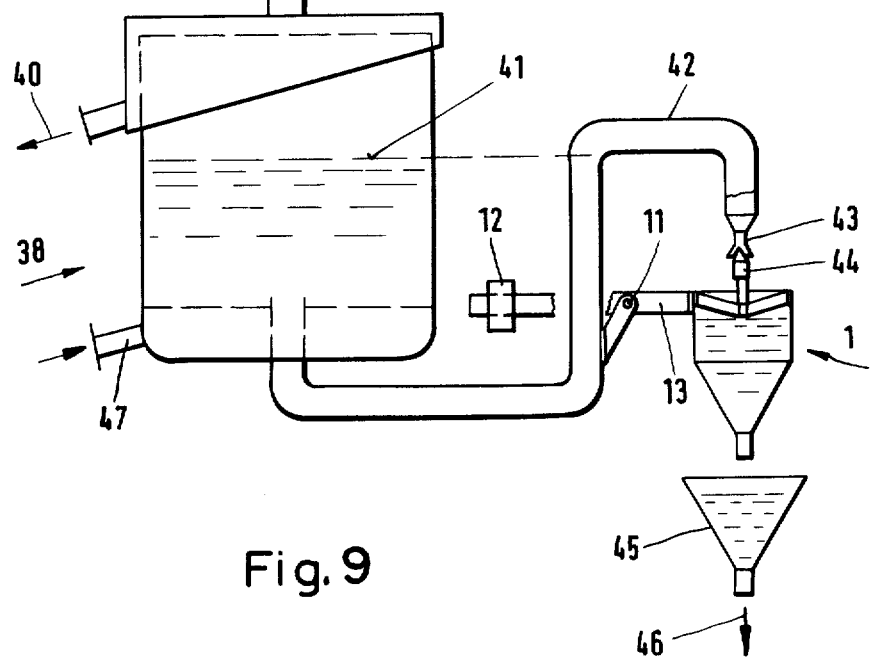
FIG. 9 schematically shows the arrangement of a viscosity-measuring container for regulation on hydraulic classifier with an inverted U-shaped solids discharge.

The embodiment of FIG. 9 shows a hydraulic classifier 38 with U-shaped solids discharge pipe 42. The principle of the instant invention can be utilized, however, in each type of upstream classifiers with a continuous slurry discharge, or can be mounted thereon. The instant invention enables the conversion of formerly discontinuously delivering stream classifiers to a continous delivery.

Figure 10:
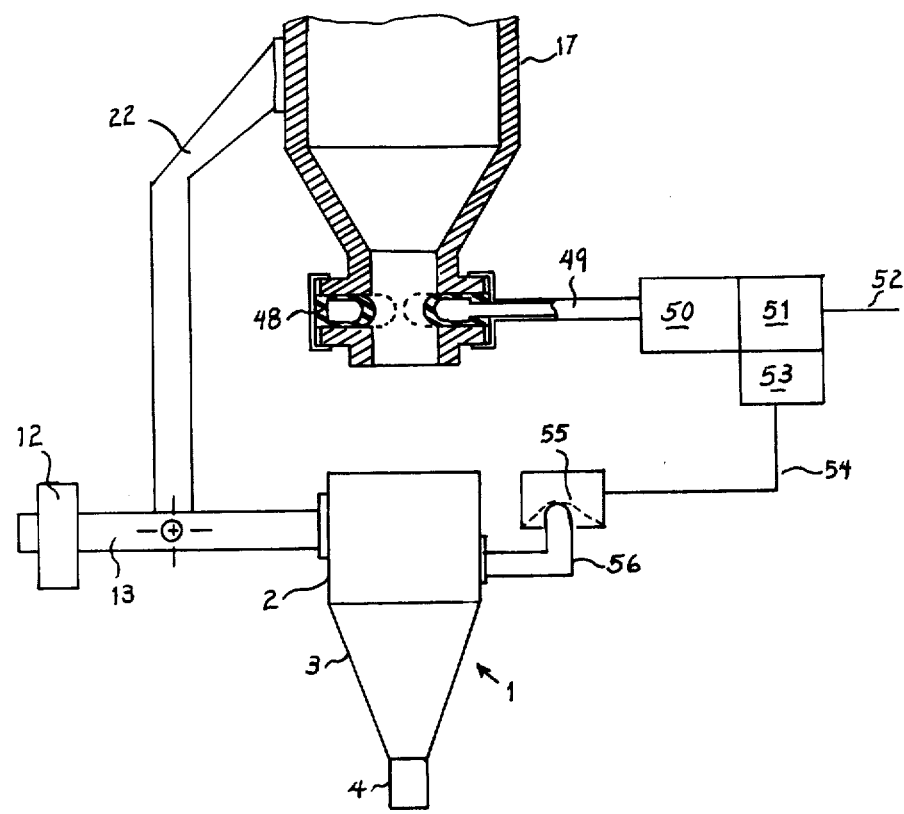
FIG. 10 schematically shows an electro-pneumatic arrangement for regulating the underflow discharge of hydrocyclone.

In FIG. 9, the feed-in is indicated at 39; the deslimed flow is indicated with numeral 40; the slurry level at 41; the U-shaped solids discharge pipe 42 carries coarse material to a slurry discharge, while 43 indicates the discharge nozzle. The opening cross section of the discharge nozzle is adjusted by means of a mandrel 44. Located below the viscosity container 1 is a slurry-collecting cone 45 from which exits the slurry 46, at the pivot point 11 is mounted the scale balance 13 with an adjustable weight and pressurized water is supplied from upstream at 47. The embodiment of FIG. 10 shows an interconnection between the viscosity container 1 and the control of the discharge of a hydrocyclone 17 using an electrical-pneumatic system. The discharge opening of the cyclone 17 is surrounded by an elastomer or rubber ring nozzle 48. The nozzle 48 is contractable by pneumatic-hydraulic pressure delivered through hose 49. The pressure fluid is provided by pump 50 driven by motor 51. The motor 51 is operated by relays 53 which are activated by pressing lever 56 pushing on pressue membrane 55 connected to relays 53 by electrical connection 54.

The instant invention also provides the possibility of regulating the discharge nozzle of solid-bowl centrifuges unperforated drum type. Hereby, an immediate mechanical effect of the viscosity-measuring container on the centrifuge would result in technical problems, since in this case the container would have to rotate therewith. However, the immediate effect due to the instant invention of the container measuring the collected slurry in a resting system (possibly after a controlled predilution) is easily possible, namely, also by means of the above-mentioned electrical, hydraulic or pneumatic regulating members. The above-mentioned embodiment of the instant invention is not illustrated in the drawing.

What I claim is:

1. A method for continuously-regulating the slurry-weight/slurry-concentration of the discharge of a means for wet-mechanical separation of solids from suspensions of solids comprising the steps of:
   A. measuring the viscosity of discharged slurry formed from separated solids by weighing the non-overflowing filling level outside of the separating means, and
   B. altering the cross-sectional opening of a discharge member from which the slurry is discharged either by increasing or decreasing the discharge cross-section so that the slurry viscosity and accordingly the slurry-weight is retained constant and at an approximately adjusted value.

2. The method as set forth in claim 1, wherein the measuring is accomplished by determining the weight of the slurry and its proportionate viscosity by collecting slurry in a container automatically, adjustable and controllingly related to the slurry discharge cross-section being controlled.

3. In a separating system including a mechanical slurry thickening apparatus, in which slurry exits from a discharge member having adjustable opening cross-section which is adjustable, comprising a viscosity-measuring container sized to be non-overflowing arranged below the discharge member, said viscosity-measuring container receiving a proportionate slurry flow exiting from the discharge member, said viscosity-measuring container including a discharge opening through which slurry flow is ejected, said container discharge opening being smaller as compared with the cross-section of the container; and adjusting means having a control portion adjustable positionable by said viscosity-measuring container for maintaining the viscosity of the exiting slurry flow at a constant rate, said adjusting means having means for enlarging or reducing the opening cross-section of the discharge member in relation to an increase or reduction of the amount of slurry located in the viscosity-measuring container above the discharge opening thereof.

4. In the separating system as set forth in claim 3 said adjusting means comprises a linkage assembly having an adjustable weight for regulating the portion controlling the opening cross-section of the slurry discharge member in relation to the weight of the viscosity-measuring container, said viscosity-measuring container being supported by said linkage assembly and counter-balanced thereon by said adjustable weight for altering the position of said control portion and the opening cross-section in accordance to different weights of the viscosity-measuring container.

5. In a separating system as set forth in claim 3 wherein said control portion comprises a mandrel positionably supported in relation to the opening cross-section of the discharge member for increasing or decreasing the cross-section of said opening in relation to the axial position of said mandrel.

6. In a separating system as set forth in claim 3 wherein said means for enlarging or reducing the opening cross-section includes electrical-pneumatic means for interconnecting said control portion and said viscosity-measuring container for adjusting the opening cross-section of said opening of the discharge member.

* * * * *